(12) United States Patent
Su et al.

(10) Patent No.: US 9,894,564 B2
(45) Date of Patent: *Feb. 13, 2018

(54) CIRCUIT-SWITCHED FALLBACK (CSFB) CALL SETUP UTILIZING MULTIPLE RF RECEIVE CHAINS

(71) Applicant: Apple Inc., Cupertino, CA (US)

(72) Inventors: Li Su, San Jose, CA (US); Wanping Zhang, San Jose, CA (US); Qiang Miao, Tianjin (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,550

(22) Filed: Oct. 25, 2016

(65) Prior Publication Data

US 2017/0041834 A1 Feb. 9, 2017

Related U.S. Application Data

(63) Continuation of application No. 14/231,556, filed on Mar. 31, 2014, now Pat. No. 9,526,038.

(60) Provisional application No. 61/807,738, filed on Apr. 2, 2013.

(51) Int. Cl.
*H04W 4/00* (2009.01)
*H04W 36/00* (2009.01)
*H04L 29/06* (2006.01)

(52) U.S. Cl.
CPC ......... *H04W 36/0022* (2013.01); *H04L 69/28* (2013.01)

(58) Field of Classification Search
CPC .......................... H04W 36/0022; H04L 69/28
See application file for complete search history.

(56) References Cited

U.S. PATENT DOCUMENTS

2009/0221287 A1* 9/2009 Balasubramanian . H04W 48/16
455/434
2010/0297979 A1 11/2010 Watfa et al.
2011/0274038 A1 11/2011 Zhu et al.
(Continued)

OTHER PUBLICATIONS

Circuit-switched fallback. The first phase of voice evolution for mobile LTE devices; Qualcomm White Paper, Copyright 2012.
(Continued)

*Primary Examiner* — Clemence Han
(74) *Attorney, Agent, or Firm* — Meyertons, Hood, Kivlin, Kowert & Goetzel, P.C.

(57) ABSTRACT

In a wireless communication system, a user equipment device (UE) may undertake a circuit-switched fallback (CSFB) process by using or more secondary radio frequency (RF) receive chains to search for candidate circuit-switched (CS) cells, in parallel with using a primary RF receive chain to wait for an extended service request (ESR) response. The UE may send, using a first RF receive chain, an ESR message on a packet-switched (PS) network in response to receiving a CS voice call page on the PS network. The UE may also start an ESR timer upon sending the ESR message, and monitor, using the first RF receive chain, for receipt of an ESR response on the PS network. While monitoring for receipt of the ESR response, the UE may use a second RF receive chain to acquire an initial CS network, and detect whether the ESR timer expires before the ESR response is received.

20 Claims, 10 Drawing Sheets

(56) References Cited

U.S. PATENT DOCUMENTS

| | | |
|---|---|---|
| 2011/0312321 A1* | 12/2011 | Ramachandran . H04W 36/0022 455/426.1 |
| 2012/0002545 A1 | 1/2012 | Watfa et al. |
| 2012/0140644 A1* | 6/2012 | Ngai ................. H04W 36/0022 370/252 |
| 2012/0189016 A1* | 7/2012 | Bakker ............... H04W 76/021 370/401 |
| 2013/0044696 A1* | 2/2013 | Dalal .................... H04W 68/00 370/329 |
| 2013/0258888 A1 | 10/2013 | Jeong et al. |
| 2014/0071951 A1 | 3/2014 | Liu et al. |
| 2014/0179318 A1 | 6/2014 | Wang |
| 2014/0226568 A1 | 8/2014 | Jeong et al. |
| 2015/0023252 A1 | 1/2015 | Aalla et al. |
| 2015/0087311 A1 | 3/2015 | Wu et al. |

OTHER PUBLICATIONS

Protocol Signaling Procedures in LTE; Rao, et al.; Radisys White Paper; Sep. 2011.

* cited by examiner

800

CIRCUIT-SWITCHED FALLBACK (CSFB) CALL SETUP UTILIZING MULTIPLE RF RECEIVE CHAINS

PRIORITY

This application is a continuation of U.S. patent application Ser. No. 14/231,556 titled "Circuit-Switched Fallback (CSFB) Call Setup Utilizing Multiple RF Receive Chains", filed on Mar. 31, 2014, which itself claims benefit of priority of U.S. Provisional Patent Application Ser. No. 61/807,738, entitled "Fast LTE to 2G/3G Circuit-Switched Fallback (CSFB) Call Setup Utilizing Multiple RF Receive Chains", filed on Apr. 2, 2013, both of which are hereby fully incorporated by reference for all purposes and to the extent not inconsistent with this application.

BACKGROUND

Field of the Application

The disclosure is directed to wireless communications and, more particularly, to fast LTE to 2G/3G circuit-switched fallback (CSFB) call setup utilizing multiple RF receiving chains in wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing the available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink, DL) refers to the communication link from the base stations to the terminals, and the reverse link (or uplink, UL) refers to the communication link from the terminals to the base stations. These communication links can be established via one or more, or a combination of, single-in-single-out (SISO), single-in-multiple-out (SIMO), multiple-in-signal-out (MISO), or a multiple-in-multiple-out (MIMO) systems.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such a base station can be employed to receive one, more than one, or all the data streams carried by the composite stream. Likewise, a mobile device can transmit data to the base station or another mobile device.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point (AP), mobile device, base station (BS), user equipment (UE), Node B (NodeB, or NB), access terminal (AT), evolved Node B (eNodeB, or eNB), and so on. The use of these and other names is not intended to indicate or mandate one particular device, one particular standard or protocol, or one particular signaling direction and is expressly intended to not limit the scope of this application in any way. The use of these and other names is strictly for convenience and such names may be interchanged within this application without any loss of coverage or rights.

Various techniques described herein can be used for various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TD-SCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 ("WiMAX"), IEEE 802.20 ("MBWA"), Flash-OFDM, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7, Rel8, Rel9, etc.) technology, as well as 3GPP2 (1×RTT, 1×EV-DO, Rel0, RevA, RevB, etc.) technology and other technologies, such as Wi-Fi, WiMAX, WMBA and the like.

Figure 1:
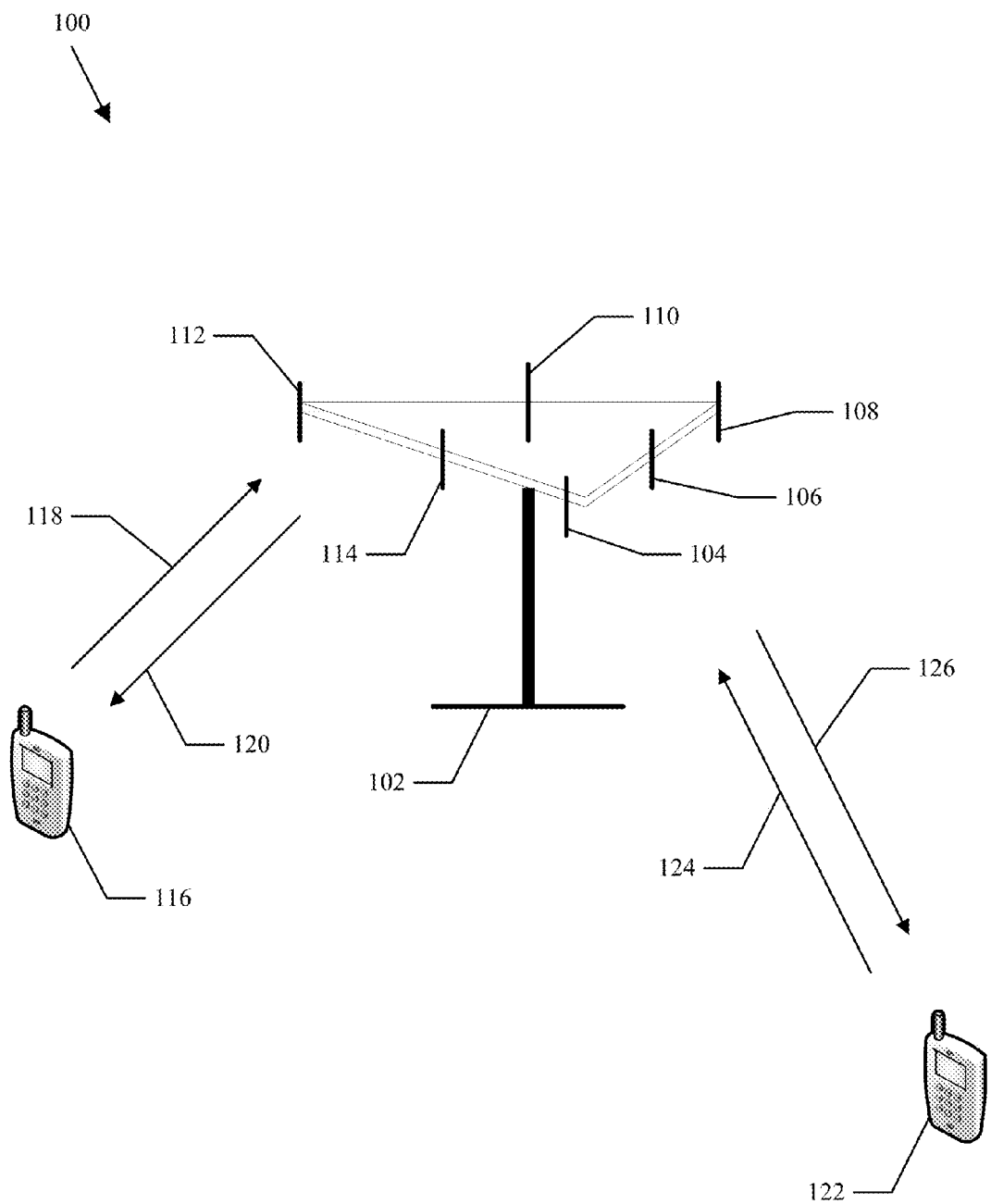
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group, and more or fewer groups may be included for eNB 102. As shown, user equipment (UE) 116 can be in communication with antennas 112 and 114, where antennas 112 and 114 transmit information to UE 116 over downlink (DL or forward link) 120 and receive information from UE 116 over uplink (UL or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequency for communication. In time division duplex (TDD) systems, these communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
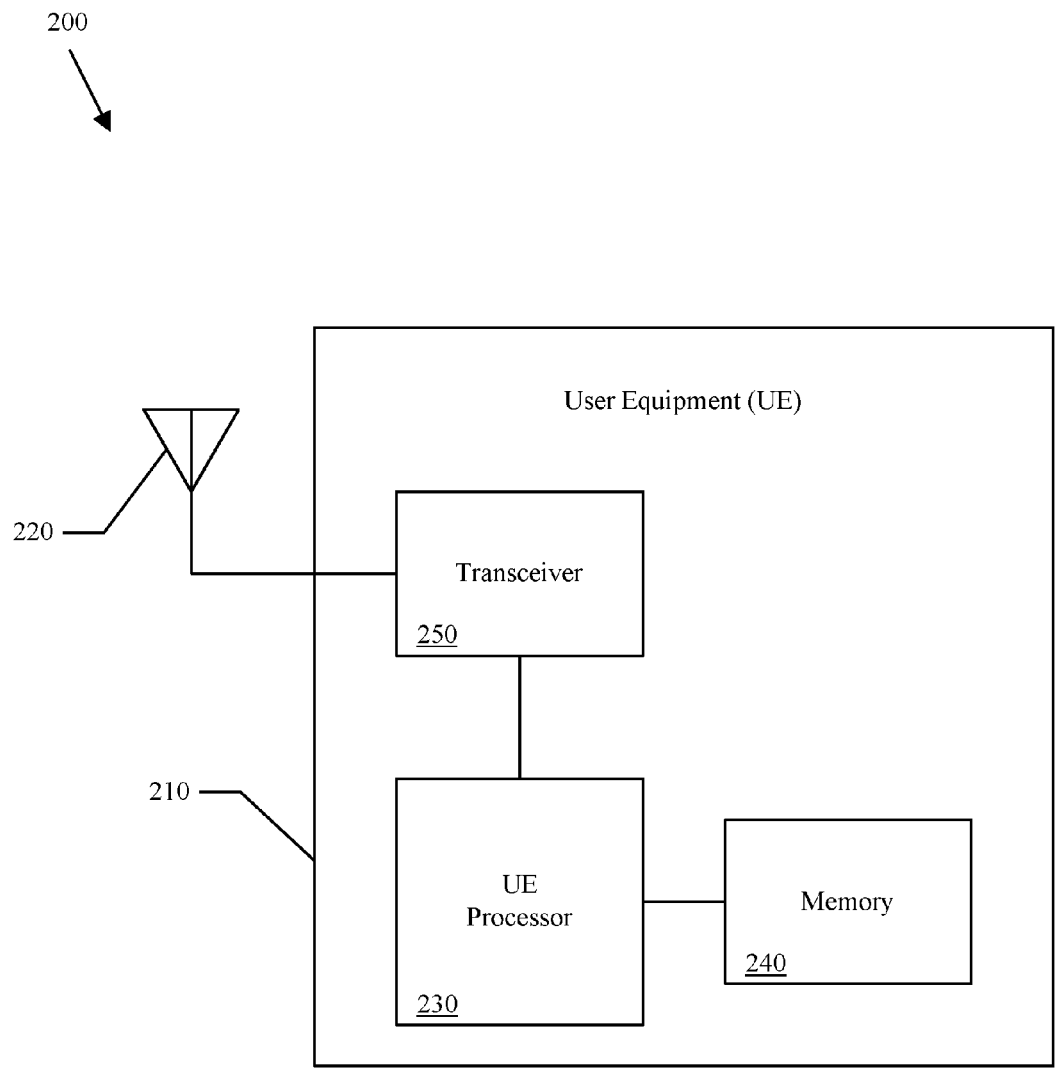
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 250, an antenna 220, a processor 230, and a memory 240 (which, in certain embodiments, may include memory in the form of a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 250 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application. Likewise, in certain embodiments, the single-block components shown in FIG. 2 may be multiple, physical components.

Figure 3:
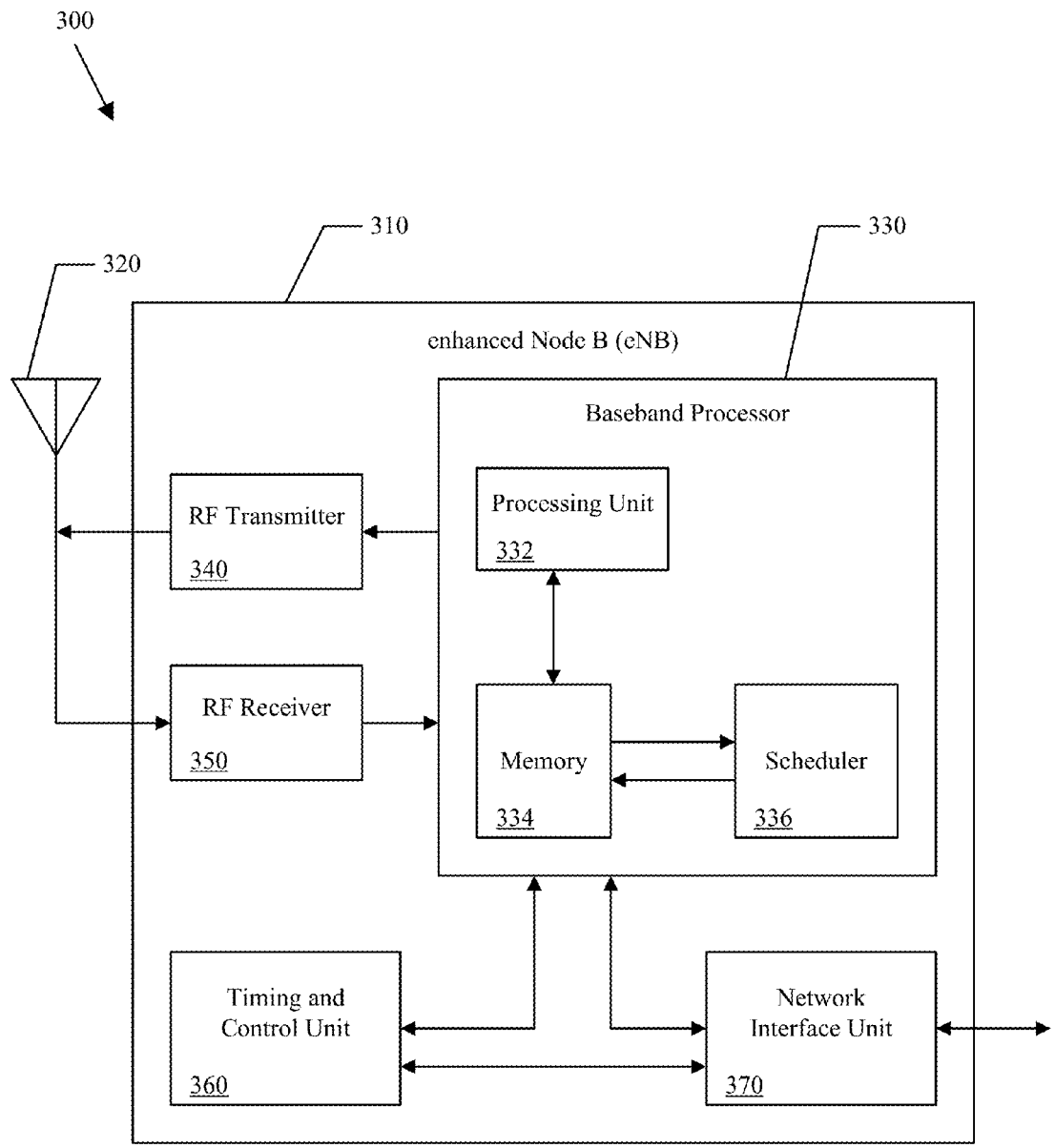
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to the eNB antenna 320. While only one antenna is shown, certain embodiments are applicable to multi-antenna configurations. RF transmitter 340 and RF receiver 350 may be combined into one, transceiver unit, or duplicated to facilitate multiple antenna connections. Baseband processor 330 may be configured (in hardware and/or software) to function according to a wireless communications standard, such as 3GPP LTE. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, as shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components and/or multiple versions of the components shown, some or all of which may be responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, thumb drives, removable memory, and optical media such as CDROM disks, digital versatile disks (DVDs), and so on.

Figure 4:
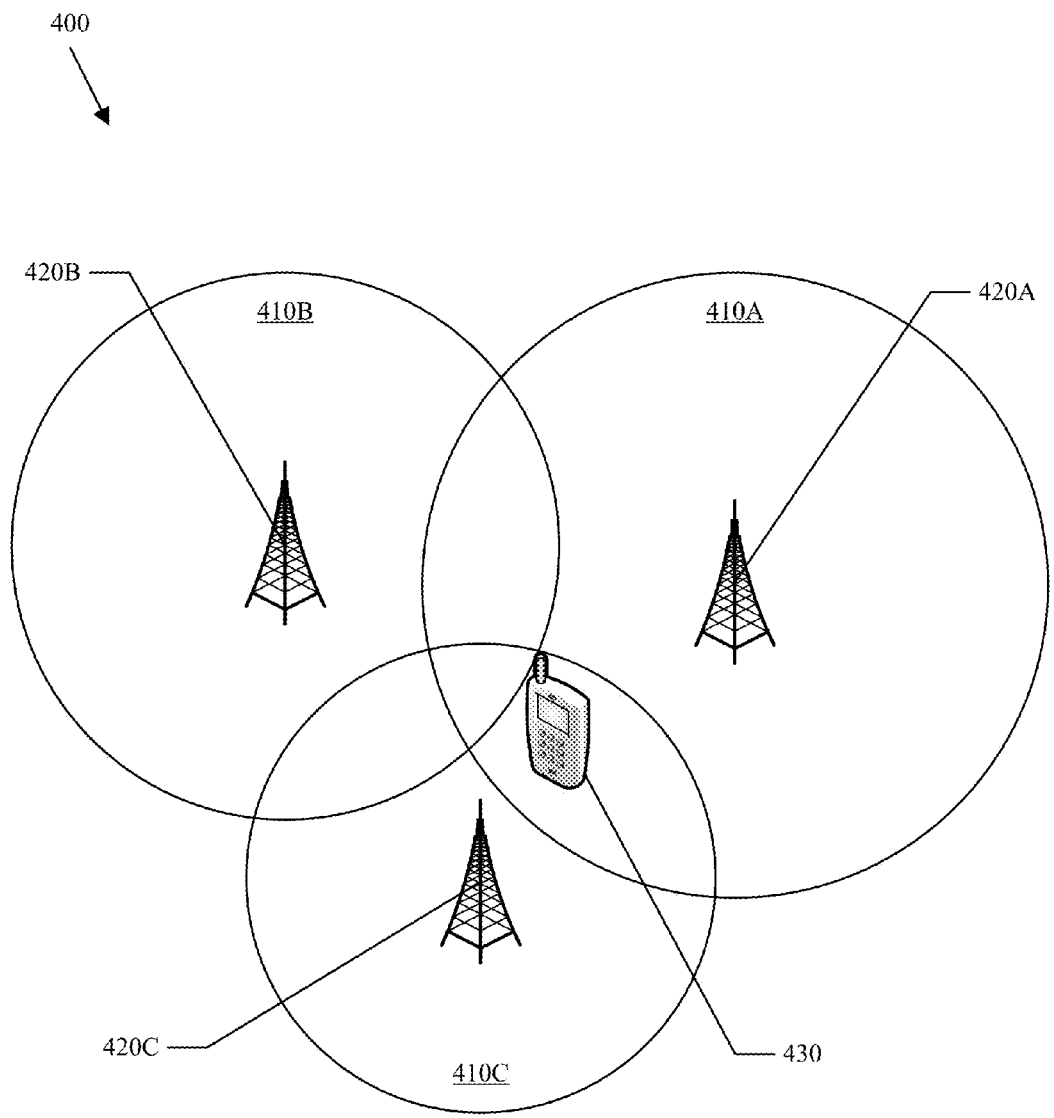
FIG. 4 illustrates a multi-cell, wireless communication system according to certain embodiments.

FIG. 4 illustrates a multi-cell, wireless communication system 400 according to certain embodiments. As shown in FIG. 4, system 400 can have a number of cellular regions (cells) 410, each of which can include a cell tower 420. Each cell tower 420 includes at least one base station (NodeB, eNodeB, access point, etc.) capable of communicating via one or more antennas (not shown) with one or more wireless devices 430. It is possible that a cell tower 420 may include multiple base stations. Each cell 410 can be configured under a different communication protocol (LTE, UTRA, CDMA2000, WiMAX, etc.) or two or more of cells 410 can be configured under the same communication protocol.

As shown in FIG. 4, device 430 can be associated with, or camped on, cell 410A, which might be an LTE cell, and can be actively communicating via cell tower 420A or can be in an idle mode within cell 410A. Device 430 may be a mobile device and be moving in a direction away from and/or towards cell tower 420A, 420B and/or 420C. In certain cases, it may be that either cell 410B or 410C is better suited for communicating with device 430. To facilitate a switch between cells, device may periodically measure the strength of surrounding cells and/or periodically perform a cell reselection procedure. In certain cases, it may be that camped-on cell 410A is an LTE cell, capable of data connectivity with device 430, and that cell 410C is a legacy 2G/3G cell (e.g., any 2G/3G 3GPP or 2GPP2 cell, such as GSM, TDSCDMA, WCDMA, CDMA, CDMA2000, 1×RTT, and so on), capable of voice connectivity with device 430.

The 3rd Generation Partnership Project (3GPP) Long Term Evolution (LTE) standard or protocol, in its various releases, is an all-IP, data transport technology using packet-switching. This is in contrast to the previous generations of mobile technologies, which use circuit-switching. Handling voice traffic on LTE devices is evolving as the mobile industry infrastructure evolves toward higher LTE availability. Currently, LTE voice traffic is handled by legacy circuit-switched (CS) networks, while data traffic is handled by LTE packet-switched (PS) networks (or by 2G/3G networks as a fallback, when LTE is not available).

Two general approaches are implemented to address the usage of both packet-switched (PS) data and circuit-switched (CS) voice networks or telephony: 1) dual radio solutions and 2) single radio solutions. Dual radio solutions use two always-on radios (and supporting chipsets, etc.), one for packet-switched LTE data and one for circuit-switched telephony and as a circuit-switched data fallback where LTE is not available. Dual radio solutions have emerged for LTE-CDMA2000 network interworking. Single radio solutions use one radio to handle both types of traffic (LTE PS data and legacy CS voice/data), and use network signaling to determine when to switch from the PS network to the CS network. This solution is generally accepted for LTE-3GPP network interworking solutions.

With circuit-switched fallback (CSFB), when the device is operating in LTE (PS data connection) mode and a call comes in for the device, the LTE network pages the device. The device responds with a special service request message to the network, and the network signals the device to move to (i.e., fall back to) the circuit-switched (CS) 2G/3G network (i.e., legacy CS network, such as any 2G/3G 3GPP or 2GPP2 cell, such as GSM, TDSCDMA, WCDMA, CDMA, CDMA2000, 1×RTT, and so on) to accept the incoming call. Similarly for outgoing calls made by the device, the same or similar special service request message is used to move the device from LTE to 2G/3G to place the outgoing call.

Figure 5:
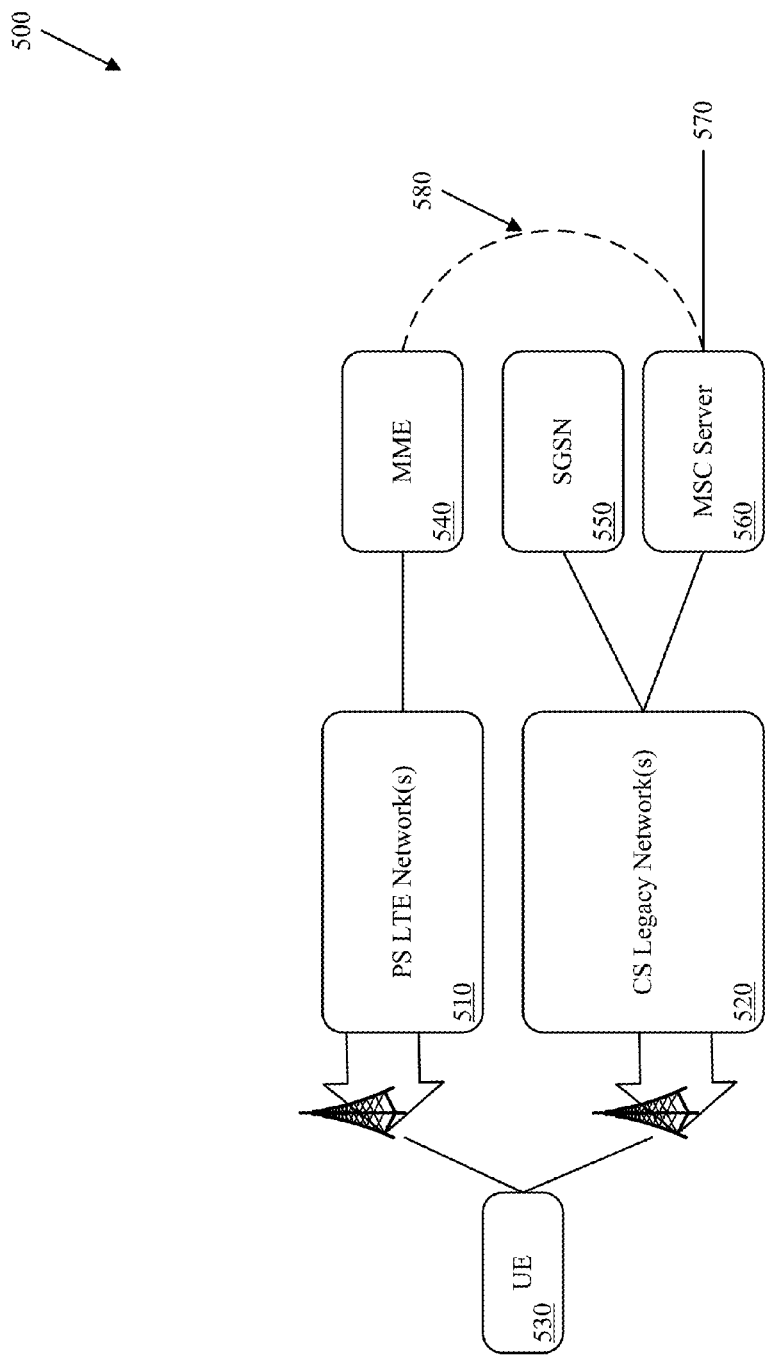
FIG. 5 illustrates an exemplary, simplified architecture for enhanced packet service (EPS) LTE and legacy CS 3GPP networks according to certain embodiments.

FIG. 5 illustrates an exemplary, simplified architecture 500 for enhanced packet service (EPS) LTE and legacy CS 3GPP networks according to certain embodiments. As shown in FIG. 5, one or more PS LTE network(s) 510 and one or more legacy CS 2G/3G network(s) 520 can co-exist between one or more user equipment (UE) 530 and the common core network(s), where a mobility management entity (MME) 540 facilitates service while in LTE mode and where a serving general packet radio service (GPRS) support node (SGSN) 550 facilitates services while in 2G/3G data mode and/or a mobile switching center (MSC) server 560 facilitates services while in 2G/3G voice mode. MSC Server 560 connects to the carrier's telephony network 570. To support CSFB signaling and short message service (SMS) transfer for LTE devices, MME 540 can connect to MSC Server 560 via interface 580, which can enable UE 530 to be both CS and PS registered. Interface 580 can also enable the delivery of CS pages and SMS via the LTE access, without having the device leave LTE.

In certain embodiments, FIG. 5 can be used to illustrate an exemplary incoming voice call using circuit-switched (CS) page via LTE. With the default LTE data network connection in operation, a mobile terminating or MT (i.e., incoming call to the UE) CS voice call may originate at telephony network 570. Then, via MSC Server 560, interface 580 and MME 540, a page can be triggered through PS LTE network(s) 510 to UE 530. Mobile originating or MO (i.e., outgoing call from the UE) call origination can follow the same general transition through PS LTE network(s) 510, MME 540, interface 580 and MSC Server 560, except that paging is not needed.

After receiving the MT CS voice call page, CSFB can be initiated at UE 530, with UE 530 sending an extended service request (ESR) to PS LTE network(s) 510 and waiting for an radio resource control (RRC) connection release message in response before transitioning to CS legacy network(s) 520. After the successful messaging, this transition can be relatively time consuming (discussed in more detail, below) and can include acquiring the 2G/3G frequency provided by the release message, and thereafter reading the system information. Once transitioned, legacy call setup procedures are followed to setup the incoming CS voice call, which also can add to the CS voice call total set-up time. After the CS voice call ends, UE 530 can return to PS LTE network(s) 510 via, for example, idle mode or connected mode mobility procedures.

In certain embodiments, when a device is paged via LTE with an incoming voice call (i.e., mobile terminated, MT), or when the user initiates an outgoing voice call (i.e., mobile originated, MO), the device switches from LTE to 2G/3G. Acquisition of the 2G/3G network and setup of the call (i.e., CSFB) can use, for example, handover or redirection. In handover, the target 2G/3G cell is prepared in advance and the device can enter that cell directly in connected mode. Inter-radio access technology (IRAT) measurements, such as signal strength, may be required while on LTE prior to the handover. In redirection, only the target frequency is indicated to the device. The device is then allowed to pick any cell on the indicated frequency, or may even try other frequencies and/or RATs if no cell can be found on the target frequency. Once a cell is found, the device initiates normal call setup procedures. IRAT measurements of signal strength may not be needed prior to redirection. Consequently, CSFB with redirection may require less time to identify the best cell compared to the handover procedure.

Redirection-based CSFB has variations with differing call setup speeds. With LTE Release 8 basic CSFB redirection, the device reads all of the system information block (SIB) messages prior to accessing the target cell. With LTE Release 8 SIB-skipping redirection, the device only reads the mandatory SIB messages (e.g., 1, 3, 5 and 7), skipping all other SIBs prior to access. With LTE Release 9 SI-tunneling redirection, the device can receive SIB information (SI) via tunneling from the target radio access network (RAN) via the core network to the source RAN and can be included in the redirection message sent to the device. This can avoid reading any SIBs on the target cell.

Figure 6:
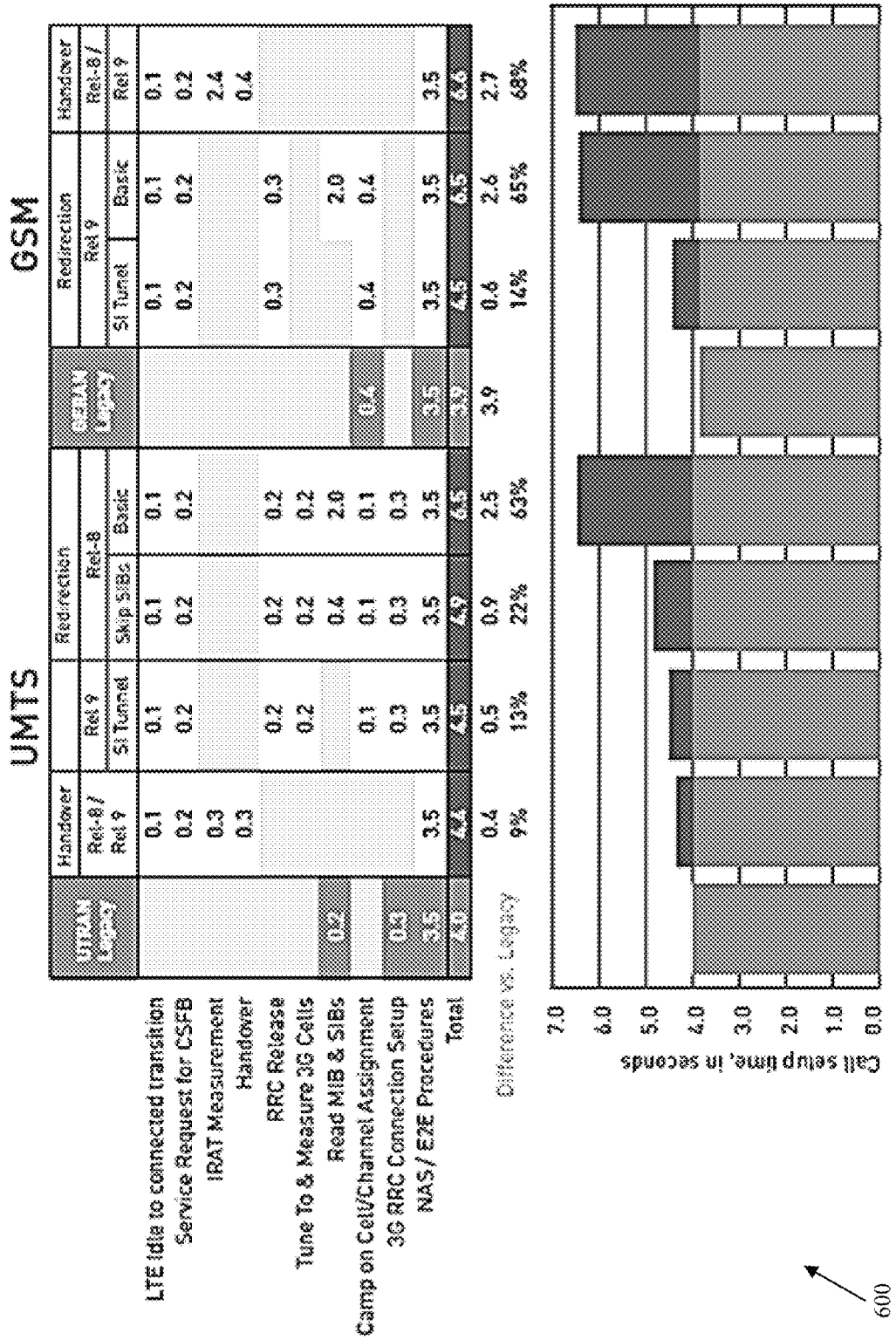
FIG. 6 illustrates exemplary outgoing mobile-originated (MO) LTE to 3G CSFB call setup times according to certain embodiments.

FIG. 6 illustrates exemplary outgoing mobile-originated (MO) LTE to 3G CSFB call setup times 600 according to certain embodiments. FIG. 6 provides call setup times by setup method, where all times are in seconds. As shown in FIG. 6, for 3G (i.e., UMTS), handover-based CSFB has the lowest outgoing call setup time penalty (i.e., +0.4 seconds, +9% above legacy 3G). Handover avoids SIB reading and access delays, but requires 0.3 seconds for IRAT measurements while on LTE. Redirection-based Release 9 SI Tunneling has only a slightly higher penalty (i.e., +0.5 seconds, +13%), by not reading SIBs. The Release 8 SIB-skipping method takes somewhat longer (i.e., +0.9 seconds, +22% vs. legacy), since reading the mandatory SIBs (i.e., 1, 3, 5 and 7) takes about 0.3 seconds. The highest call setup time penalty (i.e., +2.5 seconds, +63% vs. legacy) is incurred with the basic Release 8 redirection process, because it takes about two seconds to read all the SIBs prior to access (e.g., SIB11 and SIB12 messages can be very large depending on the number of neighbors).

As shown in FIG. 6, for 2G (i.e., GSM), redirection-based Release 9 SI-tunneling, with a +0.6 second (i.e., +14%) penalty vs. legacy 3G, significantly outperforms handover-based CSFB (i.e., +2.6 seconds, +65%) for outgoing call setup time. Release 9 Basic setup time (i.e., +2.6 seconds, +65%) is essentially equivalent to handover-based CSFB. The difference between 2G and 3G handover-based CSFB is due to the much higher IRAT measurement time of 2.4 seconds in 2G, about eight times the 0.3 seconds required for 3G, caused by less efficient synchronization and cell identification. The difference in 2G redirection-based Release 8 CSFB is the 2 seconds required to read system information blocks. Since, unlike 3G, none of the long-periodicity SIBs is expendable, the SIB-skipping option is not available.

Figure 7:
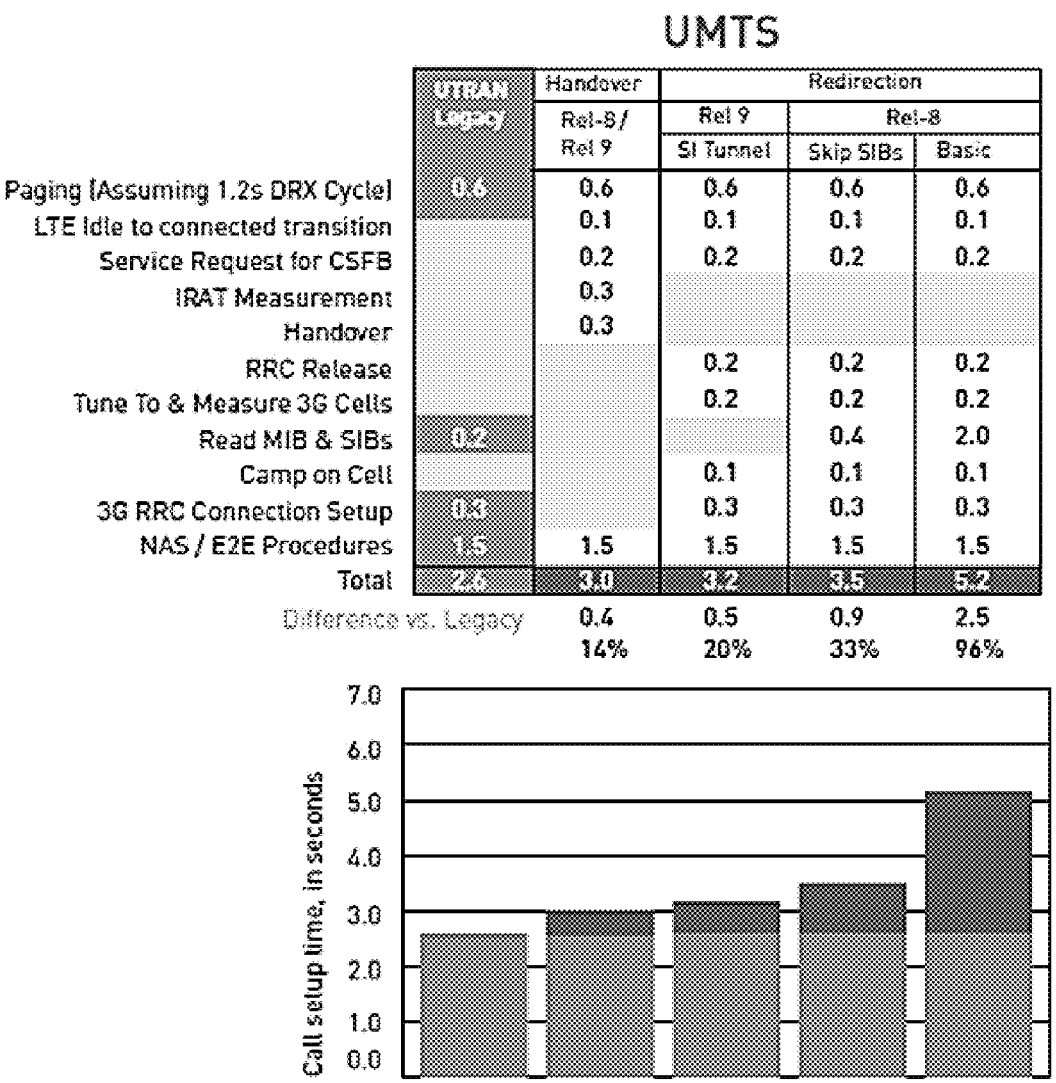
FIG. 7 illustrates exemplary incoming mobile-terminated LTE to 3G CSFB call setup times according to certain embodiments.

FIG. 7 illustrates exemplary incoming mobile-terminated LTE to 3G CSFB call setup times 700 according to certain embodiments. FIG. 7 provides call setup times by setup method, where all times are in seconds. As shown in FIG. 7, as was the case for outgoing calls on 3G (discussed above), the best CSFB incoming call setup time performance comes with handover-based call setup, but it is only slightly faster than redirection-based Rel. 9 SI-tunneling.

Figure 8:
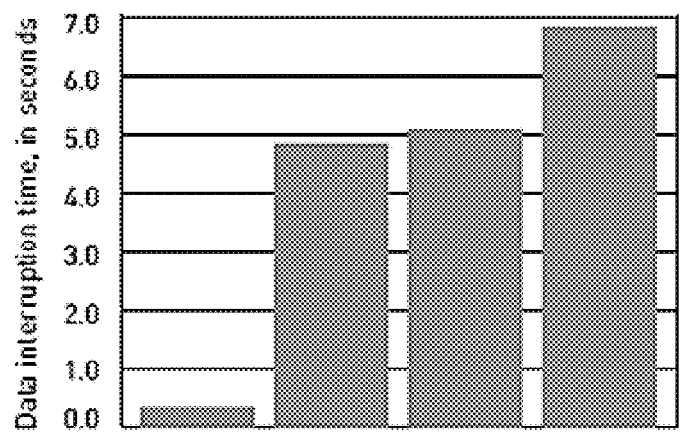
FIG. 8 illustrates exemplary voice call data interruption times according to certain embodiments.

If a user is in an active PS LTE data session (e.g., streaming media) when a voice call is initiated, the inter-RAT transition and routing area update will interrupt the data transfer. FIG. 8 illustrates exemplary voice call data interruption times 800 according to certain embodiments. FIG. 8 provides interruption times by setup method, where all times are in seconds. As shown in FIG. 8, the voice call data interruption time can depend on the mobility mechanism. Using handover-based CSFB, the data stream interruption time is approximately 0.3 seconds. However, the much higher 5+ second data stream interruption in the redirection-based CSFB methods might be an unacceptable delay to the user.

Therefore, as presented above, the CSFB process can take from 3-4 seconds (i.e., using Release 8/9 handover CSFB to 3G without data interruption) to more than 12-13 seconds (i.e., using basic Release 8 redirection CSFB to 2G/3G with data interruption). However, the worst case CSFB process is when the network does not respond at all to the ESR sent by the device (i.e., with the RRC connection release message) due to, for example, network loading or poor LTE coverage. In this case, the LTE specification requires that the UE wait until after the 10 second ESR timer expires before acquiring a suitable 2G/3G system for a voice call.

Figure 9:
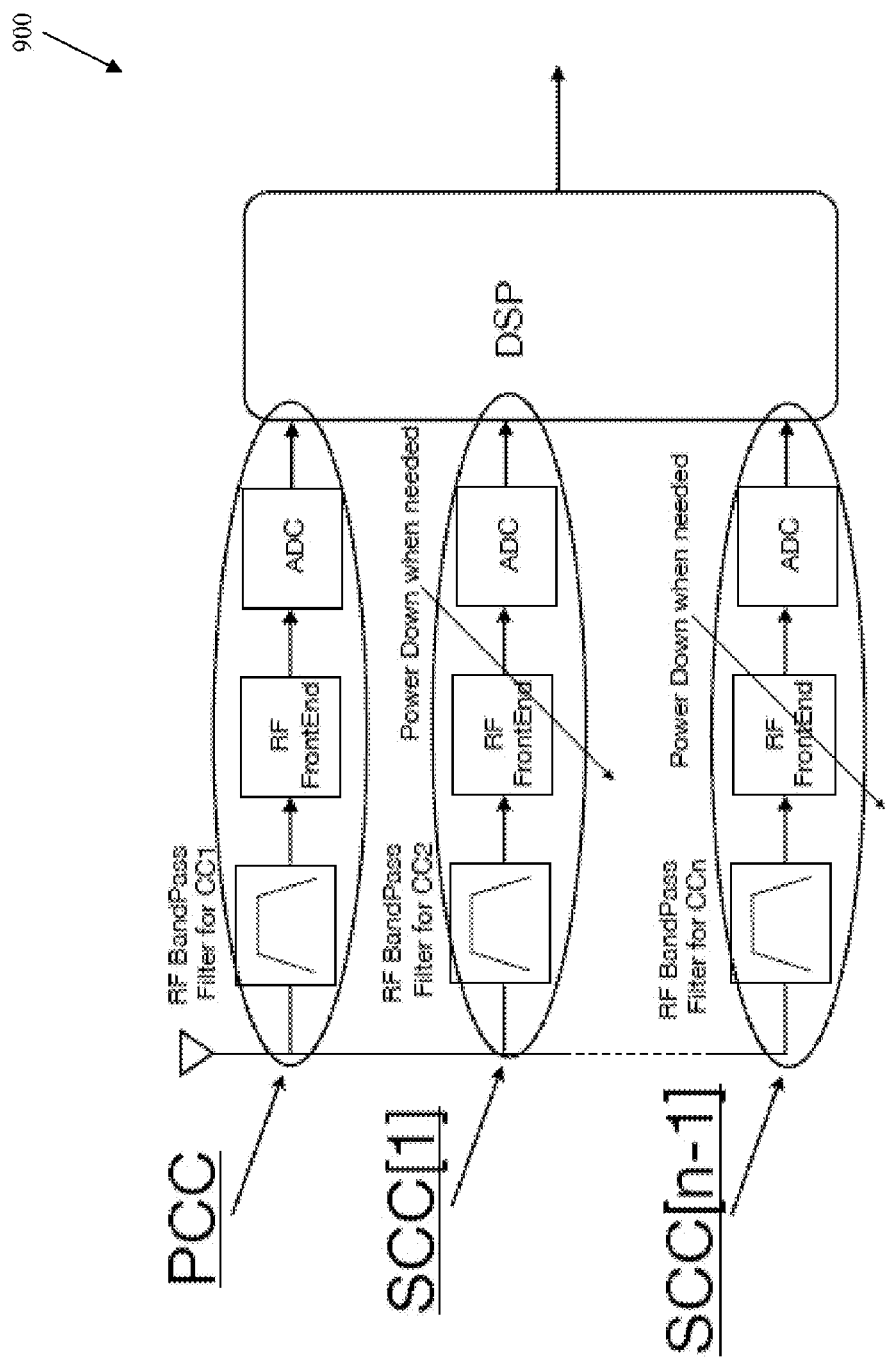
FIG. 9 illustrates exemplary transceiver architecture useful in carrier aggregation according to certain embodiments.

In 3GPP Release 10 for LTE, carrier aggregation is defined, and thus the UE can have multiple RF receive chains to facilitate using carrier aggregation. FIG. 9 illustrates exemplary transceiver architecture 900 useful in carrier aggregation according to certain embodiments. As shown in FIG. 9, each component carrier (CC) in a carrier aggregation capable device can have a separate RF receive chain and share an antenna. Alternatively, certain components of each CC receive chain may be combined and/or shared with other CC receive chains. Likewise, one or more CC receive chain may have a separate antenna from the remaining CC receive chains. As shown in FIG. 9, a primary component carrier (PCC) and each secondary component carrier (SCC) have separate RF receive chains. Each SCC receive chain (and, alternatively, the PCC receive chain) can have the ability to be selectively turned on or off (i.e., powered up or down) from each of the remaining SCC receive chains. The receive chains illustrated in FIG. 9 may be implemented, for example, as transceiver 250 as shown in FIG. 2. The antenna illustrated in FIG. 9 may be implemented as antenna 220 as shown in FIG. 2. The digital signal processor (DSP) in FIG. 9 may be implemented as UE processor 230 as shown in FIG. 2. Even though FIG. 9 illustrates multiple receive chains with specific reference to carrier aggregation and multiple component carriers, certain embodiments are equally applicable to any general configuration featuring multiple RF receive and/or transmit chains which are independently tunable to different frequencies.

In certain embodiments, an LTE device (i.e., user equipment, UE) needing to undertake a circuit-switched fallback (CSFB) process can use one or more secondary RF receive chains (SCC) to search for candidate 2G/3G cells in parallel with using a primary RF receive chain (PCC) to wait for an ESR response. In this way, CSFB call setup time can be improved.

Figure 10:
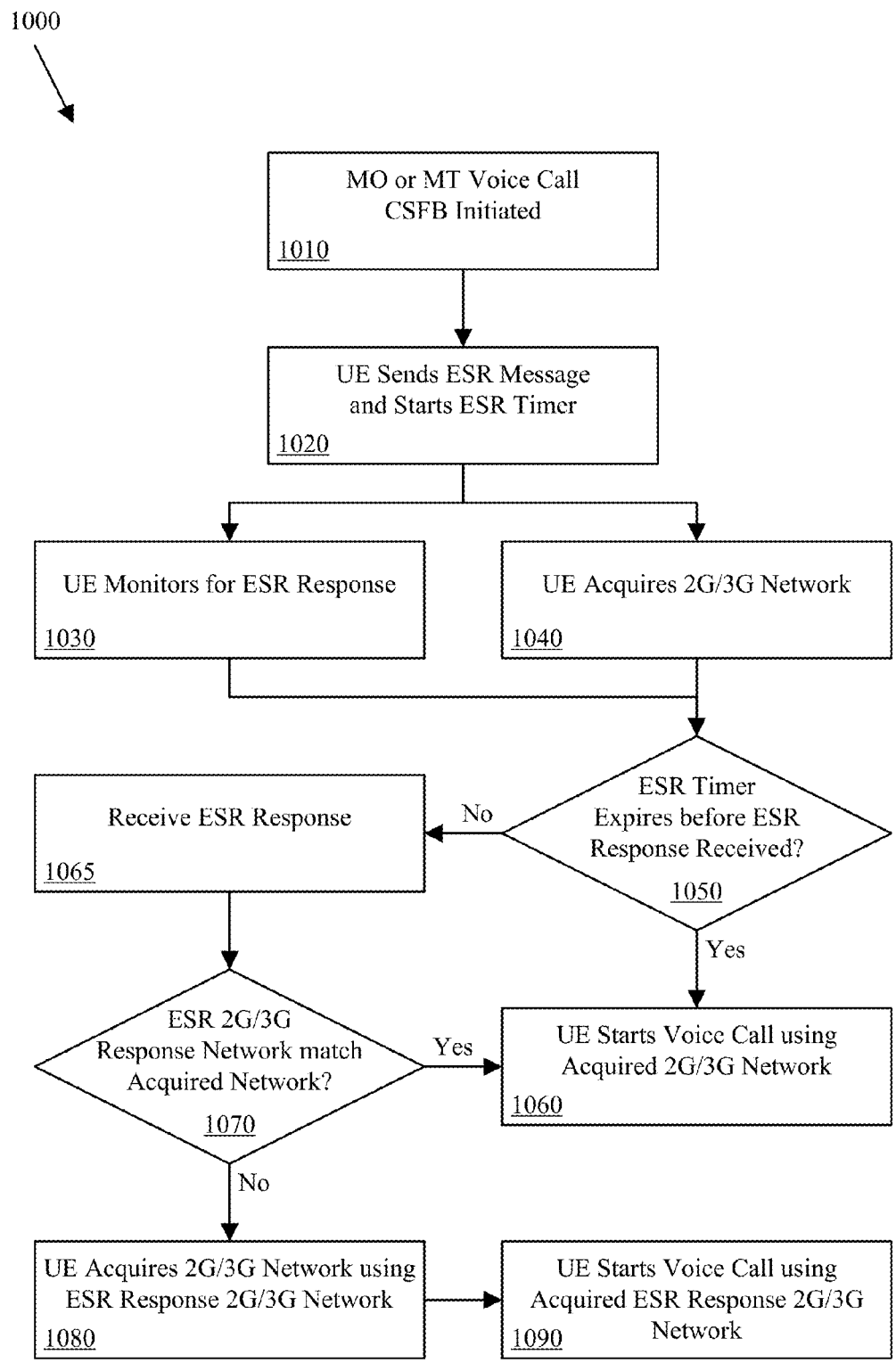
FIG. 10 illustrates an exemplary CSFB flow using multiple RF receive chains according to certain embodiments.

FIG. 10 illustrates an exemplary CSFB flow 1000 using multiple RF receive chains according to certain embodiments. As shown in FIG. 10, at 1010, a UE may need to initiate a CSFB process because of either a mobile-originated (MO, or outgoing) or mobile-terminated (MT, or incoming) CS voice call. It is assumed that this UE has multiple RF receive chains, for example, to otherwise facilitate carrier aggregation. Thus, at 1020, the UE can send an extended service request (ESR) message to the network. Also at 1020, the UE can start an ESR timer, which can be used to indicate whether too much or a prescribed amount of time has passed between sending the ESR message and not receiving a response to the ESR message. The ESR timer can be started before, during or after sending the ESR message and can be countdown timer from some prescribed or variable amount of time or a count-up timer to some prescribed or variable amount of time. The prescribed or variable amount of time for the timer may be pre-determined or dynamically determined. As an example, ESR timer may be timer T3417ext as defined in 3GPP TS 24.301 (entitled "Universal Mobile Telecommunications System (UMTS); LTE; Non-Access-Stratum (NAS); protocol for Evolved Packet System (EPS); Stage 3", which is fully incorporated herein by reference), section 5.6.1.1. Those skilled in the art will appreciate that any such timing mechanism may be used, whether new or standardized.

At 1030, the UE can use the primary RF receive chain to monitor if and/or when the network responds to the sent ESR message. Such a response, for example, may be an RRC connection release message (as previously described) and may indicate a 2G/3G system on which the UE should establish the voice call. Simultaneously with monitoring for the ESR response on the primary RF receive chain, at 1040, the UE can use one or more secondary RF receive chains to acquire a 2G/3G network. This acquisition process can include tuning to a 2G/3G frequency from the LTE IRAT neighbor list and receiving/reading the SIBs of that 2G/3G network. The UE may attempt several of these simultaneous 2G/3G network acquisitions attempts before one is acquired. As used with reference to 1030 and 1040, simultaneously is not meant to require identical start and/or stop times or completely overlapping instances, but is simply meant to indicate that the two steps, at some point in their execution, can happen virtually together or in parallel. Likewise, even though reference is made to "primary" and "secondary" receive chains, this is for convenience only and is not meant to indicate a preference for one over the other for any given function or that one is "better" than the other for any given function.

At 1050, if the UE ESR response timer expires before the UE receives an ESR response, then at 1060, the UE can begin the voice call with the already-acquired (at 1040) 2G/3G network. However, if the ESR response timer does not expire before the UE receives an ESR response 1065 (i.e., the UE does receive an ESR response before the ESR time expires), then at 1070, the UE can check to see whether the 2G/3G network indicated for CSFB in the ESR response is the same as the already-acquired (at 1040) 2G/3G network. Note that at 1065 or later in the process, the ESR response timer can be stopped; alternatively, the ESR timer can continue to run but be ignored upon expiration. If, at 1070, the 2G/3G network indicated for CSFB in the ESR response is the same as the already-acquired 2G/3G network, then at 1060, the UE can begin the voice call with the already-acquired 2G/3G network. However, if the 2G/3G network indicated for CSFB in the ESR response is not the same as the already-acquired 2G/3G network, then at 1080, the UE can acquire the new 2G/3G network for CSFB as indicated in the ESR response received at 1065. Finally, at 1090, the UE can begin the voice call with the acquired 2G/3G network for CSFB as indicated in the ESR response received at 1065.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Additionally, those skilled in the art will appreciate from the teachings of this application that any 2G/3G 3GPP or 2GPP2 cell, such as GSM, TDSCDMA, WCDMA CDMA, CDMA2000, 1×RTT, and so on can be used within the scope of this application.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not cause a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and other elements may be added.

What is claimed is:

1. An apparatus for facilitating circuit-switched fallback (CSFB) operations in a wireless communication system, the apparatus comprising:
    a processing element configured to cause a wireless communication device to:
        send an extended service request (ESR) message on a packet-switched (PS) network, at least in response to receiving a circuit-switched (CS) voice call page on the PS network, using a first radio frequency (RF) receive chain of the wireless communication device;
        start an ESR timer upon sending the ESR message;
        monitor for receipt of an ESR response on the PS network, using the first RF receive chain;
        in parallel with monitoring for receipt of the ESR response, acquire an initial CS network, using a second RF receive chain of the wireless communication device; and
        detect whether the ESR timer expires before the ESR response is received.

2. The apparatus of claim 1, wherein to acquire the initial CS network, the processing element is configured to cause the wireless communication device to:
    tune the second RF receive chain to a frequency; and
    receive system information block (SIB) messages for the initial CS network.

3. The apparatus of claim 2, wherein the processing element is configured to cause the wireless communication device to select the frequency from a neighbor list associated with the PS network.

4. The apparatus of claim 1, wherein the processing element is configured to cause the wireless communication device to determine whether to start a voice call using the initial CS network or start the voice call using a different CS network, based on when the ESR timer expires.

5. The apparatus of claim 1, wherein the processing element is configured to cause the wireless communication device to:
    start a voice call using the initial CS network, if the ESR timer expires before the ESR response is received.

6. The apparatus of claim 1, wherein the processing element is configured to cause the wireless communication device to:
    detect whether the initial CS network matches a CS network indicated in the ESR response, if the ESR response is received before the ESR timer expires.

7. The apparatus of claim 6, wherein the processing element is configured to cause the wireless communication device to:
    start the voice call using the initial CS network, if the initial CS network matches the CS network indicated in the ESR response.

8. The apparatus of claim 6, wherein the processing element is configured to cause the wireless communication device to:
    acquire the CS network indicated in the ESR response, if the initial CS network does not match the CS network indicated in the ESR response.

9. A wireless communication device comprising:
    radio frequency (RF) circuitry configured to facilitate wireless communications of the wireless communication device; and
    a processing element configured to interoperate with the RF circuitry to cause the wireless communication device to:
        transmit an extended service request (ESR) message on a packet-switched (PS) network as part of a circuit-switched fallback operation (CSFB);
        start an ESR timer upon transmitting the ESR message;
        monitor for receipt of an ESR response on the PS network;
        acquire an initial circuit-switched (CS) network simultaneously with monitoring for receipt of the ESR response; and
        detect whether the ESR timer expires before the receipt of the ESR response.

10. The wireless communication device of claim 9, wherein the processing element is configured to interoperate with the RF circuitry to further cause the wireless communication device to:
    tune an RF receive chain in the RF circuitry to a frequency selected from a neighbor list for the PS network; and
    receive system information block (SIB) messages for the initial CS network using the tuned RF receive chain.

11. The wireless communication device of claim 9, wherein the processing element is configured to interoperate with the RF circuitry to further cause the wireless communication device to:
    identify and select a CS network based at least on when the ESR timer expires; and
    start a voice call using the selected CS network.

12. The wireless communication device of claim 9, wherein the processing element is configured to interoperate with the RF circuitry to further cause the wireless communication device to:
    start a voice call using the initial CS network if the ESR timer expires before the receipt of the ESR response.

13. The wireless communication device of claim 9, wherein the processing element is configured to interoperate with the RF circuitry to further cause the wireless communication device to:
    detect whether the initial CS network matches a CS network indicated in the ESR response, if the receipt of the ESR response occurs before the ESR timer expires.

14. The wireless communication device of claim 13, wherein the processing element is configured to interoperate with the RF circuitry to further cause the wireless communication device to:
    start a voice call using the initial CS network, if the initial CS network matches the CS network indicated in the ESR response.

15. The wireless communication device of claim 13, wherein the processing element is configured to interoperate with the RF circuitry to further cause the wireless communication device to:
    acquire, for the voice call, the CS network indicated in the ESR response, if the initial CS network does not match the CS network indicated in the ESR response.

16. A non-transitory memory medium storing instructions executable by a processing element to cause a wireless communication device to:
    send an extended service request (ESR) message on a packet-switched (PS) network;
    start an ESR timer upon sending the ESR message;
    monitor for receipt of an ESR response to the ESR message on the PS network;
    acquire an initial circuit-switched (CS) network in parallel with monitoring for the receipt of the ESR response; and
    determine whether to start a voice call using the initial CS network or a different CS network based at least on when the ESR timer expires.

17. The non-transitory memory medium of claim 16, wherein the instructions are further executable by the processing element to cause the wireless communication device to:
    start the voice call using the initial CS network, if the ESR timer expires before the receipt of the ESR response.

18. The non-transitory memory medium of claim 16, wherein the instructions are further executable by the processing element to cause the wireless communication device to:
    detect whether the initial CS network matches a CS network indicated in the ESR response, if the ESR timer expires after the receipt of the ESR response.

19. The non-transitory memory medium of claim 18, wherein the instructions are further executable by the processing element to cause the wireless communication device to:
    start the voice call using the initial CS network, if the initial CS network matches the CS network indicated in the ESR response.

20. The non-transitory memory medium of claim 18, wherein the instructions are further executable by the processing element to cause the wireless communication device to:
    acquire, for the voice call, the CS network indicated in the ESR response, if the initial CS network does not match the CS network indicated in the ESR response.

\* \* \* \* \*